United States Patent Office 3,808,268
Patented Apr. 30, 1974

---

3,808,268
RESOLUTION OF DL CYSTEINE
Paul Rambacher, Rosenheim, and Siegfried Make, Kirchdorf, Germany, assignors to Diamalt Aktiengesellschaft, Munich, Germany
No Drawing. Filed Aug. 20, 1971, Ser. No. 173,669
Claims priority, application Germany, Sept. 17, 1970,
P 20 45 998.7
Int. Cl. C07c *149/20*
U.S. Cl. 260—534 S          1 Claim

ABSTRACT OF THE DISCLOSURE

DL-cysteine is separated into its optically opposite forms by reacting DL-cysteine with dicyanodiamide to obtain DL-2-guanidine-1,3-thiazolinecarboxylic acid-4, the latter being reacted with copper (II) ions and an optically active organic acid to obtain diastereomeric copper complex salts. These salts are separated on the basis of their different solubilities and D and L-cysteine are obtained from the respective salts.

SUMMARY OF THE INVENTION

The invention relates to the cleavage of DL-cysteine racemates.

It has been discovered that DL-cysteine or its hydrochloride can be reacted in aqueous solution with dicyanodiamide to obtain DL-2-guanidine-1,3-thiazolinecarboxylic acid-4. The diastereomeric copper complex salts of this acid have substantial differences in solubility with optically active acids, preferably D- or L-aspartic acid. These differences can be used for the separation of the diastereomeric forms. Since on the other hand, such copper complex salts can be easily reduced again to cysteine, the cleavage of DL-cysteine into the optically opposite forms can be effected through them.

Accordingly, the process according to the invention for cleavage of DL-cysteine into the optically opposite forms is characterized by converting DL-cysteine to DL-2-guanidine-1,3-thiazolinecarboxylic acid-4, transforming the latter into diastereomeric copper complex salts, by reaction with copper (II) ions and an optically active organic acid, thereafter separating the complex salts on the basis of their different solubilities and then obtaining D- and L-cysteine from the salts.

The optically active organic acid is preferably D- or L-aspartic acid.

The copper (II) salt of the organic acid can be introduced as such, or there can be used the optically active organic acid or a selected salt thereof together with a soluble copper (II) salt. The only essential requirement is that the copper (II) ions be made available for the formation of the complex.

The method according to the invention produces a satisfactory cleavage of the optically opposite forms.

The conversion of cysteine by dicyanodiamide preferably takes place at room temperature in an acid or alkaline aqueous solution, and by ammonia cleavage yields DL-2-guanidine-1,3-thiazolinecarboxylic acid-4, which is tautomeric with the corresponding thiazolidinecarboxylic acid.

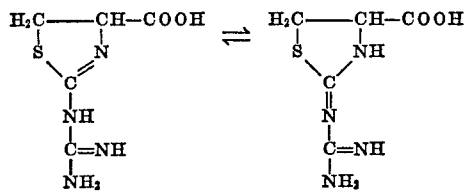

The DL-guanidiothiazolinecarboxylic acid is converted into diastereomeric copper complexes in an aqueous solution preferably with copper (II)-L-aspartate or with copper (II) ions and L-aspartic acid in equimolar proportions, slightly heated if necessary.

The difficultly soluble L-guanidinothiazolinecarboxylic acid-L-aspartic acid-copper complex is dissociated and the D-L-Cu complex left in the solution can be split by the addition of cyanide. In this way, the D-guanidinothiazolinecarboxylic acid precipitates out and can be separated. It is converted, preferably by treatment in HCl acid solution, into S-guanidinocarbonyl-D-cysteine, dihydrochloride, and this is split in partly concentrated aqueous alkali to yield D-cysteine which is oxidized in known manner to D-cystine, which due to its difficult solubility is easily isolated from weak acid solution. In like manner, the L-L-Cu complex can yield L-cystine.

It is also possible to obtain a direct cleavage of the D-guanidinothiazolinecarboxylic acid-L-aspartic acid- copper complex in acid solution without resort to the isolation of the D-guanidinothiazoline, although an optically less pure cystine is obtained.

DESCRIPTION OF A PREFERRED EMBODIMENT

The invention will next be described in detail with reference to the following example.

EXAMPLE

Into a solution of 87.7 kilograms of DL-cysteine hydrochloridemonohydrate in 500 liters of water, there are added 50 kilograms of dicyanodiamide. After 40 hours stirring at room temperature, 79.3 kilograms (equivalent to 84.5% of the theoretical quantity) of DL-2-guanidine-1,3-thiazolinecarboxylic acid-4 is precipitated.

33.9 kilograms DL-guanidinothiazolinecarboxylic acid (180 mol) and 49.6 kilograms copper-L-aspartate (180 mol) are added to 5400 liters of water at 45° C. The solution is stirred for approximately 4 days at 25–30° C. The solution is centrifuged after addition of 10 kilograms kieselguhr. From the residue there is obtained L-guanidinothiazoline carboxylic acid-L-aspartic acid-copper complex, from which L-cystine can be obtained following the procedure to be given hereafter with respect to the D-L-Cu complex.

The centrifugate is treated at room temperature with 10 liters 25% caustic soda and approximately 23.5 kilograms potassium cyanide until decolorized. It is brought to pH 7.5 with 7 liters glacial acetic acid, cooled and restirred for at least 10 hours at 5–10° C. Precipitated D-guanidinothiazolinecarboxylic acid is discharged and dried. The result is 7.95 kilograms of acid which is then dissolved in 70 liters of water and 35 liters of concentrated hydrochloric acid. After standing overnight at room temperature, the solution is concentrated in vacuum to about one quarter of its volume, cooled, and the produced S-quanidinocarbonyl-D-cysteinedihydrochloride is sucked away, and washed and dried in the presence of air. A resultant quantity of 10.2 kilograms of the salt is poured into 48 liters of 25% caustic soda at 35° C., stirred for 2 hours at 35–40° C., with about 25 liters concentrated hydrochloric acid to neutralize to a pH 7–8, and stirred again for 24 hours at 10–12° C. About 800 grams of a by-product (S-guanidinocarbonyl-D-cysteine) is separated, the filtrate is treated with 1 liter of concentrated ammonia and oxidized while cooling with approximately 3 liters of 16.5% hydrogen peroxide solution until the SH reaction is negative. Concentrated hydrochloric acid and glacial acetic acid are added until the pH is brought to 5, and then it is restirred for 48 hours with pH control and the D-cystine is sucked off. After drying in air, about 4 kilograms of D-cystine is obtained having at least 98% purity. The specific rotation $[\alpha]_D^{20}$ amounts to +210° (c.=3/1n HCl).

What is claimed is:

1. A method for the cleavage of DL-cysteine into its optically opposite forms, said method comprising reacting DL-cysteine with dicyanodiamide in aqueous solution to obtain DL-2-guanidine-1,3-thiazolinecarboxylic acid-4, reacting the latter with copper (II) L or D aspartate to obtain diastereomeric copper complex salts having different solubilities, separating the salts on the basis of their different solubilities, splitting the diastereomeric copper complex salts after their separation, with potassium cyanide to obtain optically active quanidinothiazolinecarboxylic acids, treating said acids with an acid to obtain an optically active salt and subsequently reacting the salt with an alkali to form the optically active cysteine.

References Cited

UNITED STATES PATENTS 3,381,031　4/1968　Dwyer et al. ---------- 260—518

OTHER REFERENCES

Greenstein: "Chemistry of the Amino Acids (1961), pp. 1914–1923.

Leach et al.: C.A. 71, 124872w (1969).

Nowak: C.A. 70, 115526p (1969).

LORRAINE A. WEINBERGER, Primary Examiner

J. F. TERAPANE, Assistant Examiner

U.S. Cl. X.R.

260—306.7